United States Patent [19]

Watson, Jr.

[11] 4,279,680

[45] Jul. 21, 1981

[54] METHODS FOR FORMING THINWALL STRUCTURES

[76] Inventor: Louis L. Watson, Jr., 1708 Ferndale Cir., West Sacramento, Calif. 95691

[21] Appl. No.: 928,998

[22] Filed: Jul. 28, 1978

[51] Int. Cl.³ ................. B29D 9/00; B28B 1/16; E04B 1/32; E04B 7/10
[52] U.S. Cl. .................. 156/212; 52/80; 264/32; 264/35; 264/225; 264/256; 264/257; 264/333
[58] Field of Search .............. 264/32, 256, 225, 35, 264/333, 257; 52/80, 81; 156/212

[56] References Cited

U.S. PATENT DOCUMENTS

| | | | |
|---|---|---|---|
| 1,940,401 | 12/1933 | Dischinger | 52/80 |
| 2,827,002 | 3/1958 | Weidlinger | 52/80 |
| 2,912,940 | 11/1959 | Baroni | 52/80 |
| 2,928,360 | 3/1960 | Heine | 52/80 |
| 3,090,162 | 5/1963 | Baroni | 52/80 |
| 3,506,746 | 4/1970 | Fontaine | 264/32 |
| 3,899,854 | 8/1975 | Huddle | 52/80 |
| 3,932,969 | 1/1976 | Matras | 264/32 X |

FOREIGN PATENT DOCUMENTS

| | | | |
|---|---|---|---|
| 230326 | 4/1959 | Australia | 52/80 |
| 1924312 | 1/1971 | Fed. Rep. of Germany | 52/80 |

*Primary Examiner*—Philip Anderson

[57] ABSTRACT

This invention concerns a method for forming thinwall structures from fiberglass, ferrocement or similiar materials in shapes that are inherently optimum in cost-strength effectiveness. Reinforcing means are hung from elevated points forming a catenary surface and then saturated with a post setting material. The structure is inverted after it is stable onto mirror image supports causing its elements to be in compression with negligible bending or tensile stresses.

2 Claims, 5 Drawing Figures

FIGURE 5. FLOW CHART
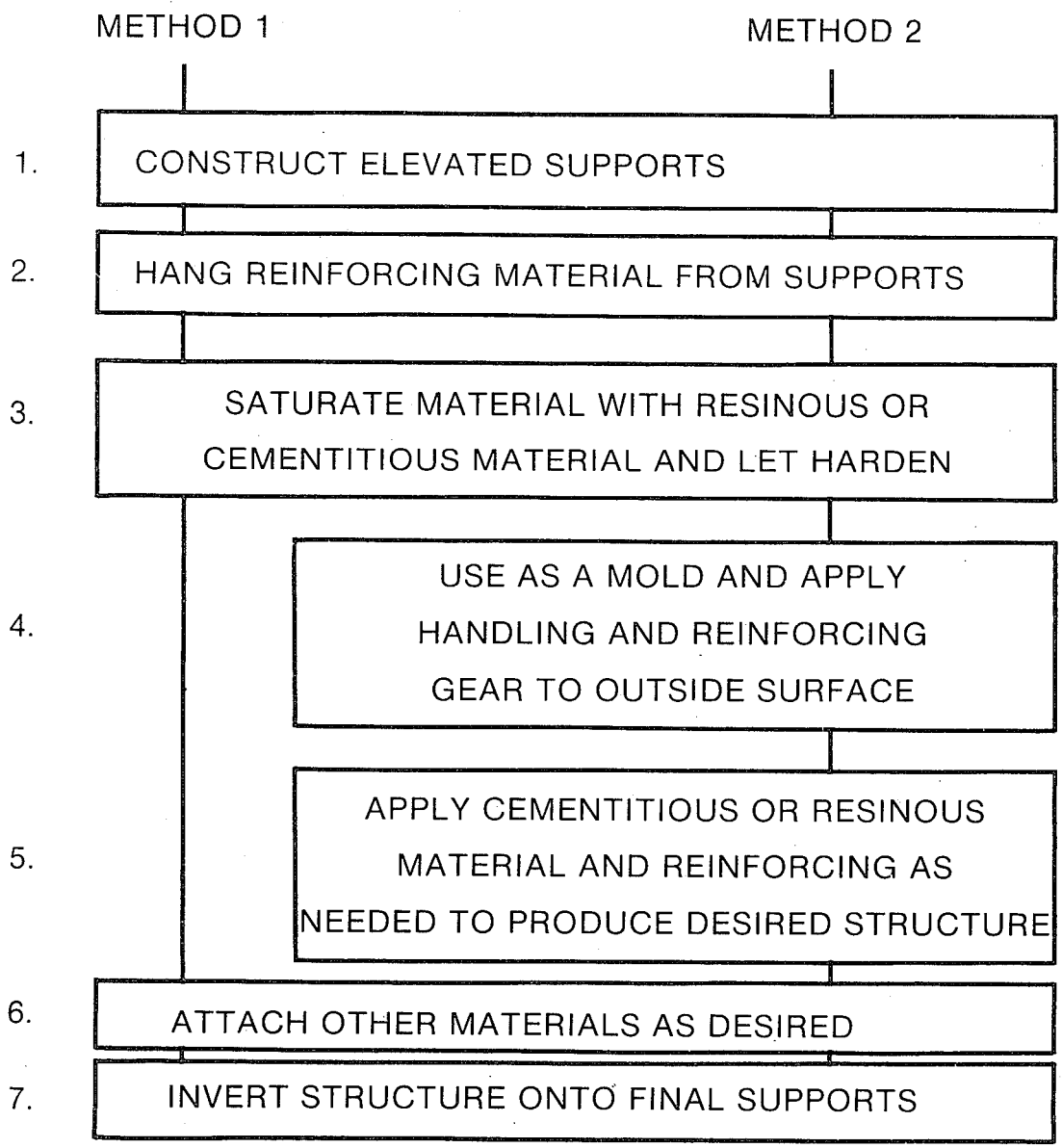

METHODS FOR FORMING THINWALL STRUCTURES

In early times, domes and vaulted roofs were constructed of stone and brick. They used little or no reinforcing and were stable under compressive stresses only. Through trial and error, safe vault curvatures were developed but the structure had to be rather thick to prevent buckling.

The near ideal shape for self supporting rooflike structures in compression is an inverted catenary surface. The dome type structures that have been constructed in the past use materials more effectively only as they approach this shape. Any other shapes, including geodesic, hemispherical, parabolic, etc. have buckling and/or tension forces requiring more structure to compensate these forces. The form work for any dome also has been expensive or inaccurate, requiring much greater thickness in the structural design for buckling safety.

Attempts have been made in the past to utilize inflatable forms and flexible membranes as molds, but they are distorted by uneven loads of workers and materials during the casting process and cracking problems are increased during the curing time if the mold is not perfectly stable.

It is therefore a general object of this invention to provide an improved method for forming thinwall structures.

It is a more particular object of this invention to provide a method for forming thinwall structures which alleviates the problems involved with inflatable or flexible membrane forms.

It is a very important object of this invention to provide a method of forming thinwall roof structures that cause the elements of said structure to be in compression with negligible bending or tensile stresses, thereby requiring less material, especially reinforcing means.

It is another object of this invention to provide a method of forming thinwall roof structures, using the least materials possible, stable under compression with negligible bending or tensile stresses.

It is another object of this invention to provide a method of forming thinwall structures by suspending closely spaced reinforcing means from elevated point(s) and/or line(s) which may then be saturated with a resinous or cementitious material, all to be inverted after a suitable curing time.

It is still another object of this invention to provide a method for forming thinwall structures and especially exact duplicate structures by making a rigid mold by suspending closely spaced reinforcing means from elevated points and/or lines, which may then be saturated with resinous or cementitious material; said rigid mold could then be used with suitable release agents, cementitious and/or resinous materials and reinforcing means as needed to produce the required structure and after suitable curing time the structure would be inverted.

The following description in conjunction with the accompanying drawings more fully disclose these objects.

FIG. 3 is also a perspective view of a mold from which parts can be made by spraying, casting or laminating processes.

FIG. 5 is a flow chart of two ways this invention could be used.

Figure 1:
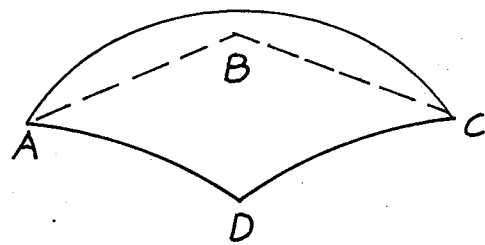
FIG. 1 is a perspective view of a finished structure built in accordance with this invention.

Referring to FIG. 1, a typical structure constructed in accordance with a method of this invention is shown. It is supported along lines AB and BC and point D. This is the same support geometry utilized in FIG. 2 and/or FIG. 3. If the finished structure were to be supported by points A,B,C and D instead, natural catenary suspension from these points in FIG. 2 would result in catenary curves on all edges of the structure. This would be the preferred method of construction rather than cutting out areas and increasing unit stresses in other areas.

Figure 2:
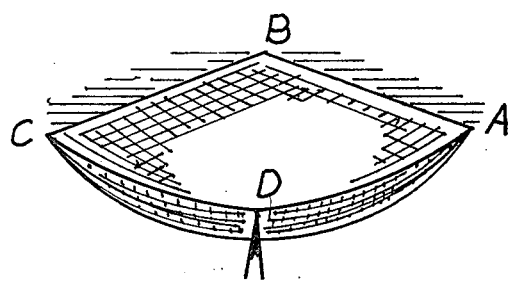
FIG. 2 is a perspective view of closely spaced reinforcing material hanging in a catenary surface from elevated supports in accordance with this invention.

Referring to FIG. 2, a closely spaced reinforcing means such as fiberglass cloth or woven wire fabric that is free to move at the intersections is hung in a catenary surface from elevated supports of conventional materials along lines AB and BC and at point D.

Figure 3:
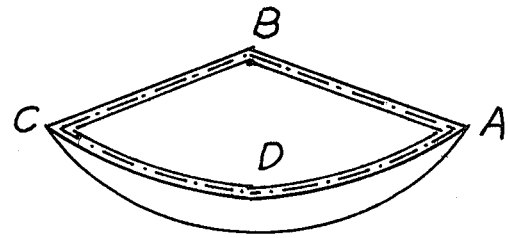
FIG. 3 is a perspective view of the material in FIG. 2 after the saturating resinous or cementitious material has enveloped it and hardened.

Referring to FIG. 3, a cementitious or resinous material has saturated and enveloped the reinforcing material and has been allowed to harden. Additional structural, insulative, accoustical or finish materials (not shown) may be laminated or affixed as needed to obtain the desired results.

Figure 4:
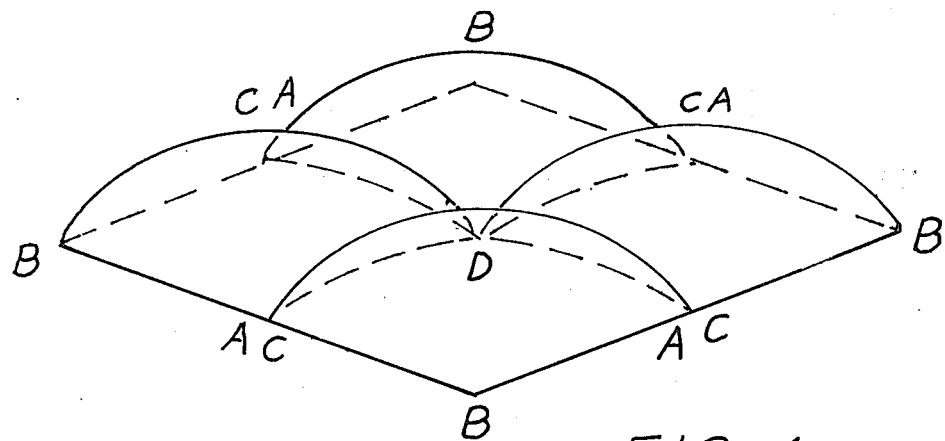
FIG. 4 is a perspective view of the assembly of multiple parts made by this invention.

Referring to FIG. 4, for larger structures (above 10,000 sq. ft. in covered area, or possibly a smaller area) an assembly of parts made by this invention is shown. Fastening of the parts (not shown) could be by bolting the edges or locking extended reinforcing means in a closing pour of cementitious or resinous material with any additional reinforcing materials required (also not shown), and Referring to FIG. 5, a flow chart shows two methods by which a structure could be made utilizing this invention. Method I would probably be best for a few parts and Method II for multiple production, especially if exact size were important. In either case, Step #1 would be to construct elevated supports in a mirror image to the permanent supports, since the part will be inverted into its final position. Step #2 is to hang the reinforcing means (preferably fiberglass cloth or woven wire fabric that can only stretch on the bias) from the supports in a catenary surface; usually in a combination of vault and curvature to use minimum material for given loads (not within the scope of this patent).

Step #3 is to saturate and envelop the reinforcing means with a resinous or cementitious material as appropriate as quickly as possible so all of the reinforcing is uniformly weighted before it begins to harden. Upon hardening, the essential form is set for Method I (a structural part) or Method II (a mold for the production of multiple structural parts). To continue Method II with step #4, suitable reinforcing and handling gear would be laminated and/or affixed to the mold outside surface. Step #5 uses release agents, resins, cements and reinforcing materials as needed to spray, cast or laminate a structural part in the mold.

Method I and Method II continue with Step #6 where structural, insulative, accoustical or finish material can be added as desired. Finally in Step #7, but possibly before the previous step, the structure would be inverted and placed on permanent supports.

From the foregoing, it can be seen that two new methods have been devised to obtain a thinwall structure having the desired structural qualities of an inverted catenary surface without using flexible membranes as forms.

I claim:

1. The method of forming a thinwall structure which comprises constructing elevated supports, hanging closely spaced reinforcing means between said supports in essentially a catenary surface, stabilizing the reinforcing means by saturating and enveloping them with resinous or cementitious material which is allowed to harden and finally inverting the structure onto mirror image supports causing its elements to be in compression with negligible bending or tensile stresses.

2. The method of forming a thinwall structure adapted to function as a mold which comprises constructing elevated supports, hanging closely spaced reinforcing means between said supports in essentially a catenary surface, stabilizing the reinforcing means by saturating and enveloping them with resinous or cementitious material which is allowed to harden, laminating additional reinforcing materials to the outside surface of the stabilized reinforcing means, and finally inverting said structure onto mirror image supports causing its elements to be in compression with negligible bending or tensile stresses.

* * * * *